United States Patent [19]

Desrondiers

[11] Patent Number: 5,894,045
[45] Date of Patent: Apr. 13, 1999

[54] CELLULAR CORE STRUCTURE BUILDING COMPONENT

[76] Inventor: Bernard R. Desrondiers, 8762 Elvira Ave., Westminster, Calif. 92683

[21] Appl. No.: 08/747,525

[22] Filed: Nov. 12, 1996

[51] Int. Cl.$^6$ .................................. B32B 3/12; E04C 2/34
[52] U.S. Cl. .................. 428/178; 428/174; 428/180; 52/793.1
[58] Field of Search .................. 428/178, 174, 428/180, 131; 52/793.1, 789.1

[56] References Cited

U.S. PATENT DOCUMENTS

| | | | |
|---|---|---|---|
| 1,984,653 | 12/1934 | Palmer et al. | 428/178 |
| 2,809,908 | 10/1957 | French | 428/178 |
| 2,849,758 | 9/1958 | Plumley | 20/15 |
| 3,086,899 | 4/1963 | Smith et al. | 428/178 |
| 3,561,177 | 2/1971 | Argo et al. | 52/173 |
| 3,834,962 | 9/1974 | Strumbos | 198/79 |
| 3,842,768 | 10/1974 | Maistre | 114/16 R |
| 3,914,486 | 10/1975 | Borgford | 428/73 |
| 3,996,654 | 12/1976 | Johnson | 29/458 |
| 4,039,708 | 8/1977 | Okada | 428/73 |
| 4,061,812 | 12/1977 | Gilwee, Jr. et al. | 428/117 |
| 4,076,877 | 2/1978 | Tanzen | 428/23 |
| 4,162,341 | 7/1979 | Norton | 428/117 |
| 4,251,579 | 2/1981 | Lee et al. | 428/73 |
| 5,028,474 | 7/1991 | Czaplicki | 428/178 |

*Primary Examiner*—Donald Loney
*Attorney, Agent, or Firm*—Dennis W. Beech

[57] ABSTRACT

The cellular core structure building element is a three dimensional arrangement of pyramidal elements in a continuous rectangular pattern interconnected at their bases by a base plane panel. The pyramid elements are normally void internally to form a structurally strong, lightweight panel. The common pyramid structure is modified by truncating the top of the pyramid to form a top face and by flattening the side face edges to form edge faces thereby creating a pyramid with a top face, four side faces and four edge faces. For best strength as a construction or building material, two cellular core structure sheets are superimposed one on the other by inverting and offsetting one relative to the other such that when mated the pyramid elements of one sheet fit between the pyramid elements of the other such that mating faces may be attached. Continuous faces sheets may be added to the external faces of the structure.

5 Claims, 2 Drawing Sheets

5,894,045

1

CELLULAR CORE STRUCTURE BUILDING COMPONENT

BACKGROUND OF THE INVENTION

1. Field of the Invention

This invention relates to structural cores generally used to form lightweight panels, walls or other structural elements. Such structural elements may be formed of sheet material such as metal, plastic, paper, fabric or composite material so configured to provide the core structure as a matrix structure to which face sheets may be affixed. The new structural element provides a strong, interlocking core to form, for example, a glass fiber sandwich type structure panel for use in construction.

2. Description of Related Art

There are currently in use various types of cellular structure building component designs for construction of all manner of objects in which structural integrity and light weight are important or required. These cellular structure patterns include the well known octagonal shape for building geodesic domes and the sandwich structures used to form panels with thin wall cellular cores commonly known as honeycomb core panels because of the appearance of hexagonal shaped compartments created in the forming of the core element. The core element may be formed using other geometric shapes suitable for sandwiching between face sheets and allowing for a reasonable method for manufacture as discussed regarding related art and disclosed in U.S. Pat. No. 5,028,474, issued Jul. 2, 1991.

The present invention provides a simple pattern for manufacture of the cellular core structure which is assembled by inverting the pattern on itself and attachment by adhesive bonding, welding, fasteners or other suitable attachment means. Once assembled in this manner the cellular core structure creates a strong, lightweight structure with face surfaces broken by the pyramidal cell voids. If added strength or a continuous face surface is desired, face sheets may be attached to the cellular core structure. The invention uses a simple one shape formed panel to be easily assembled into a two piece lightweight, strong cellular core panel having face surfaces for attachment of other desired elements.

SUMMARY OF THE INVENTION

A primary objective of the present invention is to provide a simple cellular element for cellular core structure formation and ease of assembly into a cellular core panel structure to provide a lightweight, strong building component. Another object is to provide a three-dimensional modified pyramidal element for use to form a cellular core structure panel when the pyramidal structure is inverted on itself and attached by a suitable means for attachment. A further object of the invention is to provide the pyramidal core structure for assembly on itself with matching face elements for attachment surfaces for shear resistance and structural integrity. A still further object of the invention is to provide a cellular core structure which when assembled has voids for introduction of insulating material or if sealed provides for buoyancy flotation as for example when used in boat construction.

In accordance with the description presented herein, other objectives of this invention will become apparent when the description and drawings are reviewed.

2

Figure 2:

FIG. 2 illustrates a side elevation view of the cellular core structure showing the truncated pyramid top.

Figure 3:

FIG. 3 illustrates a side elevation view of one cellular core structure having a second cellular core structure inverted and assembled thereon with the structures shown in cross section along line A—A.

Figure 4:
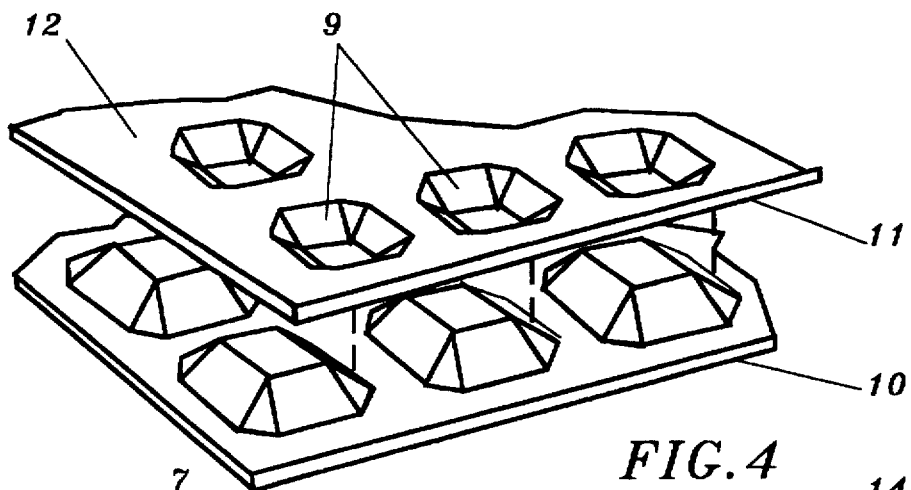

FIG. 4 illustrates a perspective view of one cellular core structure aligned for assembly with an inverted second cellular core structure.

Figure 5:
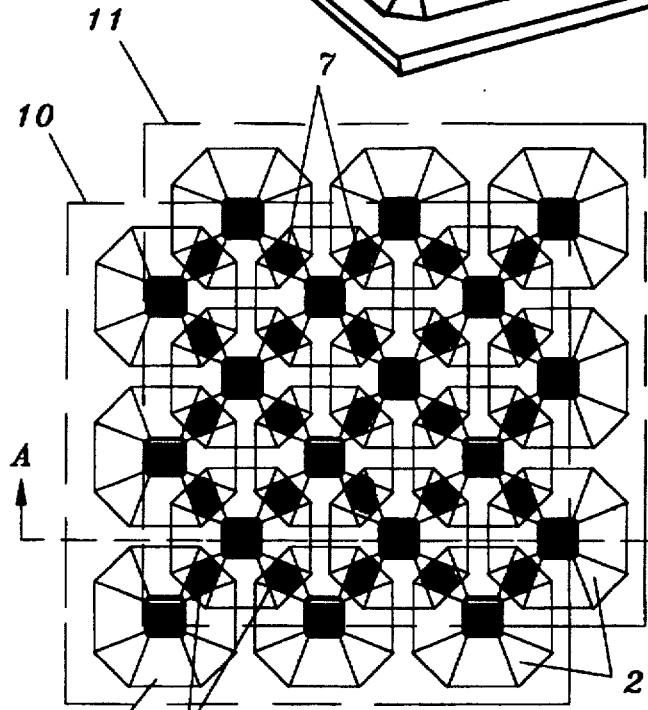

FIG. 5 illustrates a top plan view of one cellular core structure assembled together with an inverted or bottom plan view of a second cellular core structure with touching faces highlighted.

Figure 6:
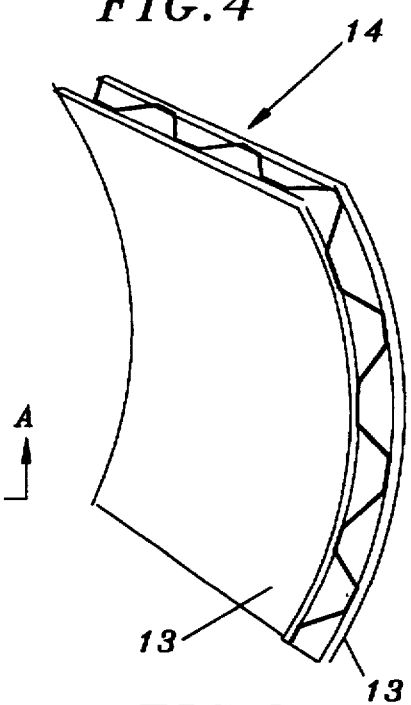

FIG. 6 illustrates a perspective view of a cellular core structure panel with attached face sheets formed in a curved shape.

DESCRIPTION OF THE PREFERRED EMBODIMENT

The cellular core structure building element is formed of a matrix pattern of three-dimensional modified pyramidal cellular core elements interconnected together in the plane of the bases thereof. The pyramid cellular core element has a truncated top and flattened edge elements to form a nine face pyramid structure. When the cellular core structure is inverted relative to itself and properly aligned, two panels of the cellular core structure mated together have one pyramid cellular core element four edge faces touching an edge face on each of four pyramid elements and a top face touching a base plane panel. These faces may be attached by bonding, mechanical fasteners or other suitable means to form the cellular core structural panel. Face sheets may be attached to the base plane panel bases if a continuous face sheet is desired for construction purposes.

Figure 1:
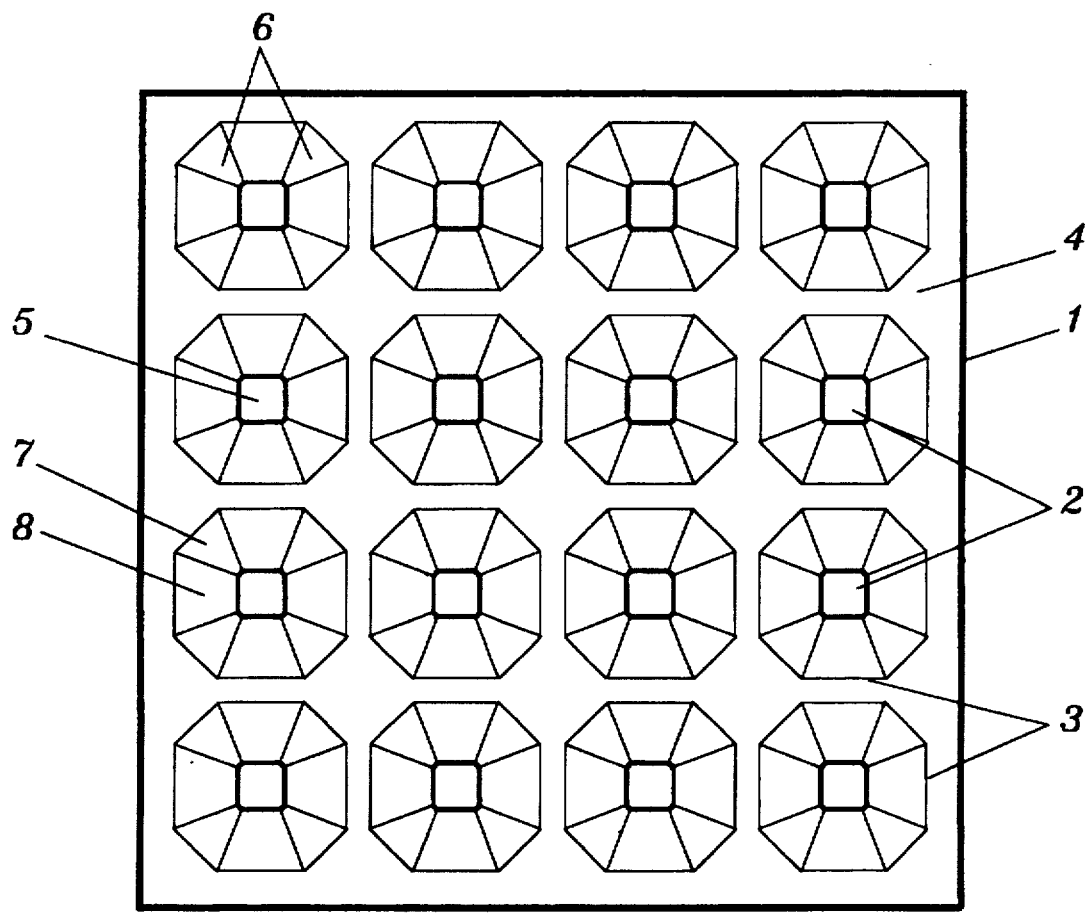
FIG. 1 illustrates a top plan view of the cellular core structure building component.

Referring to FIG. 1 and 2, the cellular core structure (1) is illustrated as formed of a single panel of material with a regular matrix pattern of three-dimensional pyramidal cellular core elements or pyramid elements (2) interconnected in the plane of their bases (3) by a base plane panel (4). The pyramid element (2) is void internally and has no base (3) side or face thus creating three dimensional aperture cells (9) in the cellular structure (1) when viewed from the bottom.

The pyramid element (2) is truncated at the top to form a top face (5). In addition, the pyramid edges (6) illustrated in ghosted form in FIG. 1 are flattened to form four edge faces (7). The pyramid element (2) thus has a top face (5), four side faces (8) and four edge faces (7).

A model of such a cellular core structure (1) was assembled using a pyramid height of 0.5 inches with 45 degree sloped side faces (8) and edge faces (7) having a base width of 1.5 inches and a top face (5) width of 0.5 inches. The spacing between laterally adjacent pyramid elements (2) face side base lines was 0.2 inches which created a 0.7 inch distance between edge face (7) base lines for pyramid elements (2) diagonally adjacent to each other. The angle of the edge face (7) base line relative to the side face (8) base line in the plane of the base (3) was 45 degrees.

Referring to FIGS. 3 through 5, a first cellular core structure sheet (10) is illustrated in assembly with a second cellular core structure sheet (11) which is inverted relative to the first sheet (10). The two sheets (10, 11) are offset relative each to the other such that a pyramid element (2) of sheet (11) fits between an edge face (7) of four diagonally adjoining pyramid elements (2) of sheet (10).

As can be seen in FIG. 4 when the sheets (10, 11) are aligned for superposition with the joining planes shown in dotted lines between the two sheets (10, 11), the pyramid elements (2) of sheet (11) fit between the pyramid elements (2) of sheet (10). FIG. 5 has been highlighted to indicate the mating portions of the edge faces (7) of the adjoining pyramid elements (2) and the top faces (5) to the base plane panels (4). Depending on the composition and depth of the sheets (10, 11) the mating surfaces are attached by bonding, mechanical fasteners or other suitable means and the area of the mating surfaces of the edge faces (7) will vary.

As can be seen, two base plane panel external faces (12) are formed with aperture cells (9) contained therein. The external faces (12) provide a surface to which other elements may be attached. As illustrated in FIG. 6, a face sheet (13) has been attached to each external face (12) to create a typical sandwich panel (14) with continuous external surfaces. When a composition such as glass fiber is used to form such sandwich panels (14), the panels may be formed in a variety of shapes and curvatures for purposes such as building glass fiber boats. If the panels are sealed by the bonding or adhesive to trap air the panel can provide buoyancy for a boat. In addition, for other construction purposes the voids in the panel may be filled with a suitable material for insulation purposes.

I claim:

1. A three dimensional structure comprising:

a plurality of pyramid elements arranged in a continuous rectangular pattern interconnected at a base by a base plane panel;

the pyramid elements being truncated at the top to form a top face; and the pyramid four side faces being connected by four edge faces wherein the side faces and the edge faces are sloped at 45 degrees relative to the base plane panel and the edge face is joined at a 45 degree angle to the side face relative to a plane parallel to the base plane panel.

2. The three dimensional structure as in claim 1 wherein the pyramid height is 0.5 inches, the pyramid base length is 1.5 inches and the face sheet length is 0.5 inches with laterally adjacent pyramid elements 0.2 inches apart.

3. The three dimensional structure as in claim 1 wherein the pyramid element is internally void creating an aperture cell therein.

4. The three dimensional structure as in claim 1 wherein a first cellular core structure sheet has inverted and superimposed integrally with it a second cellular core structure sheet such that the pyramid elements of the first cellular core structure sheet fit between the pyramid elements of the second cellular core structure sheet and are attached to each by a means for attachment between the edge faces which adjoin and the top faces and the base plane panel which adjoin.

5. The three dimensional structure as in claim 4 wherein an external face has attached by a means for attachment a face sheet.

\* \* \* \* \*